(12) United States Patent
Kim et al.

(10) Patent No.: US 8,149,366 B2
(45) Date of Patent: Apr. 3, 2012

(54) LIQUID CRYSTAL DISPLAY AND THIN FILM TRANSISTOR PANEL THEREFOR

(75) Inventors: Dong-Gyu Kim, Yongin-si (KR); Back-Won Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 267 days.

(21) Appl. No.: 12/564,449

(22) Filed: Sep. 22, 2009

(65) Prior Publication Data

US 2010/0009479 A1 Jan. 14, 2010

Related U.S. Application Data

(63) Continuation of application No. 11/508,643, filed on Aug. 23, 2006, now Pat. No. 7,675,597, which is a continuation of application No. 10/817,473, filed on Apr. 2, 2004, now Pat. No. 7,113,242.

(30) Foreign Application Priority Data

Apr. 4, 2003 (KR) .............................. 2003-0021313

(51) Int. Cl.
G02F 1/136 (2006.01)
G02F 1/1343 (2006.01)
G02F 1/1335 (2006.01)

(52) U.S. Cl. ............ 349/139; 349/39; 349/43; 349/145; 349/146

(58) Field of Classification Search .......... 349/139–141, 349/106, 39, 43, 145–146
See application file for complete search history.

(56) References Cited

U.S. PATENT DOCUMENTS

| | | |
|---|---|---|
| 5,626,796 A | 5/1997 | Tsujimura et al. |
| 6,097,464 A | 8/2000 | Liu |
| 6,172,729 B1 | 1/2001 | Ikeda |
| 6,633,360 B2 | 10/2003 | Okada et al. |
| 6,710,836 B2 | 3/2004 | Lee |
| 6,861,368 B2 | 3/2005 | Chae |
| 6,897,909 B2 | 5/2005 | Ochiai et al. |
| 6,900,871 B1 | 5/2005 | Song et al. |
| 7,113,242 B2 | 9/2006 | Kim et al. |
| 7,483,105 B2 * | 1/2009 | Jun et al. ............ 349/139 |
| 2001/0019391 A1 * | 9/2001 | Kim et al. .......... 349/139 |
| 2002/0008827 A1 * | 1/2002 | Yoo et al. ............ 349/141 |
| 2002/0118330 A1 | 8/2002 | Lee |
| 2003/0071951 A1 * | 4/2003 | Jun ...................... 349/129 |
| 2003/0133055 A1 | 7/2003 | Um et al. |
| 2004/0201811 A1 | 10/2004 | Jun |

FOREIGN PATENT DOCUMENTS

| | | |
|---|---|---|
| CN | 1181517 | 5/1998 |
| JP | 06-308536 | 4/1994 |
| JP | 06-230419 | 8/1994 |
| JP | 06-250220 | 9/1994 |
| JP | 2001-109009 | 4/2001 |
| KR | 1020000057973 | 9/2000 |
| KR | 1020020007899 | 1/2002 |
| KR | 1020020070756 | 9/2002 |
| KR | 1020030023481 | 3/2003 |
| TW | 594123 | 6/2004 |

* cited by examiner

*Primary Examiner* — Huyen Ngo
(74) *Attorney, Agent, or Firm* — F. Chau & Associates, LLC

(57) ABSTRACT

A thin film transistor panel for a liquid crystal display includes a substrate, a plurality of data lines formed over the substrate and extending in a first direction, and a plurality of gate lines formed over the substrate and extending in a second direction. The plurality of gate lines cross the plurality of data lines to form a plurality of pixel areas, each of the plurality of pixel areas having a multi-bent band shape. Each of a plurality of pixel electrodes are formed in a corresponding pixel area.

21 Claims, 13 Drawing Sheets

LIQUID CRYSTAL DISPLAY AND THIN FILM TRANSISTOR PANEL THEREFOR

CROSS-REFERENCE TO RELATED APPLICATION

This application is a continuation of U.S. application Ser. No. 11/508,643, filed on Aug. 23, 2006 now U.S. Pat. No. 7,675,597, which in turn is a continuation of U.S. application Ser. No. 10/817,473 filed Apr. 2, 2004, which issued as U.S. Pat. No. 7,113,242, the disclosures of which are each all incorporated by reference herein in their entireties.

BACKGROUND (a) Technical Field

The present disclosure relates to liquid crystal displays and thin film transistor array panels for liquid crystal displays.

(b) Discussion of Related Art

Liquid crystal displays (LCDs) are one of the most widely used flat panel displays. An LCD includes a liquid crystal (LC) layer interposed between two panels provided with field-generating electrodes. The LCD displays images by applying voltages to the field-generating electrodes to generate an electric field in the LC layer, which determines orientations of LC molecules in the LC layer to adjust polarization of incident light.

A disadvantage of LCDs is that they have a narrow viewing angle. Various techniques for enlarging the viewing angle have been proposed, including a technique utilizing a vertically aligned LC and providing cutouts or protrusions at the field-generating electrodes, such as the pixel electrodes and the common electrode.

Since the cutouts and the protrusions reduce the aperture ratio, the area occupied by the cutouts and the protrusions must be minimized. However, the width of the cutouts and the protrusions should be larger than a predetermined value and the distance between the cutouts and the protrusion should be smaller than a predetermined value to obtain stable LC domains defined by the cutouts and the protrusions and low response time of the LC.

Accordingly, there is a need for a thin film transistor panel of a liquid crystal display that provides an enlarged viewing angle while ensuring stable LC domains and low response time.

SUMMARY OF THE INVENTION

A thin film transistor panel for a liquid crystal display according to an embodiment of the invention comprises a substrate, a plurality of data lines formed over the substrate and extending in a first direction, and a plurality of gate lines formed over the substrate and extending in a second direction. The plurality of gate lines cross the plurality of data lines to form a plurality of pixel areas, each of the plurality of pixel areas having a multi-bent band shape. Each of a plurality of pixel electrodes is formed in a corresponding pixel area.

A liquid crystal display according to an embodiment of the invention includes a thin film transistor panel, a common electrode panel and a liquid crystal layer disposed between the thin film transistor panel and the common electrode panel. The thin film transistor panel includes a first substrate, a plurality of data lines formed over the first substrate and extending in a first direction, and a plurality of gate lines formed over the first substrate and extending in a second direction. The plurality of gate lines cross the plurality of data lines to form a plurality of pixel areas, each of the plurality of pixel areas having a multi-bent band shape. Each of a plurality of pixel electrodes is formed in a corresponding pixel area. The common electrode panel includes a second substrate, a black matrix formed over the second substrate, and a common electrode formed over the black matrix.

A method of forming a thin film transistor panel of a liquid crystal display according to an embodiment of the invention includes forming a plurality of data lines over a substrate, the plurality of data lines extending in a first direction, and forming a plurality of gate lines over the substrate, the plurality of gate lines extending in a second direction and crossing the plurality of data lines to form a plurality of pixel areas. Each of the plurality of pixel areas has a multi-bent band shape. A pixel electrode is formed in each of the plurality of pixel areas.

BRIEF DESCRIPTION OF THE DRAWINGS

The present invention will become more apparent by describing embodiments thereof in detail with reference to the accompanying drawings in which.

DESCRIPTION OF PREFERRED EMBODIMENTS

Figure 1:
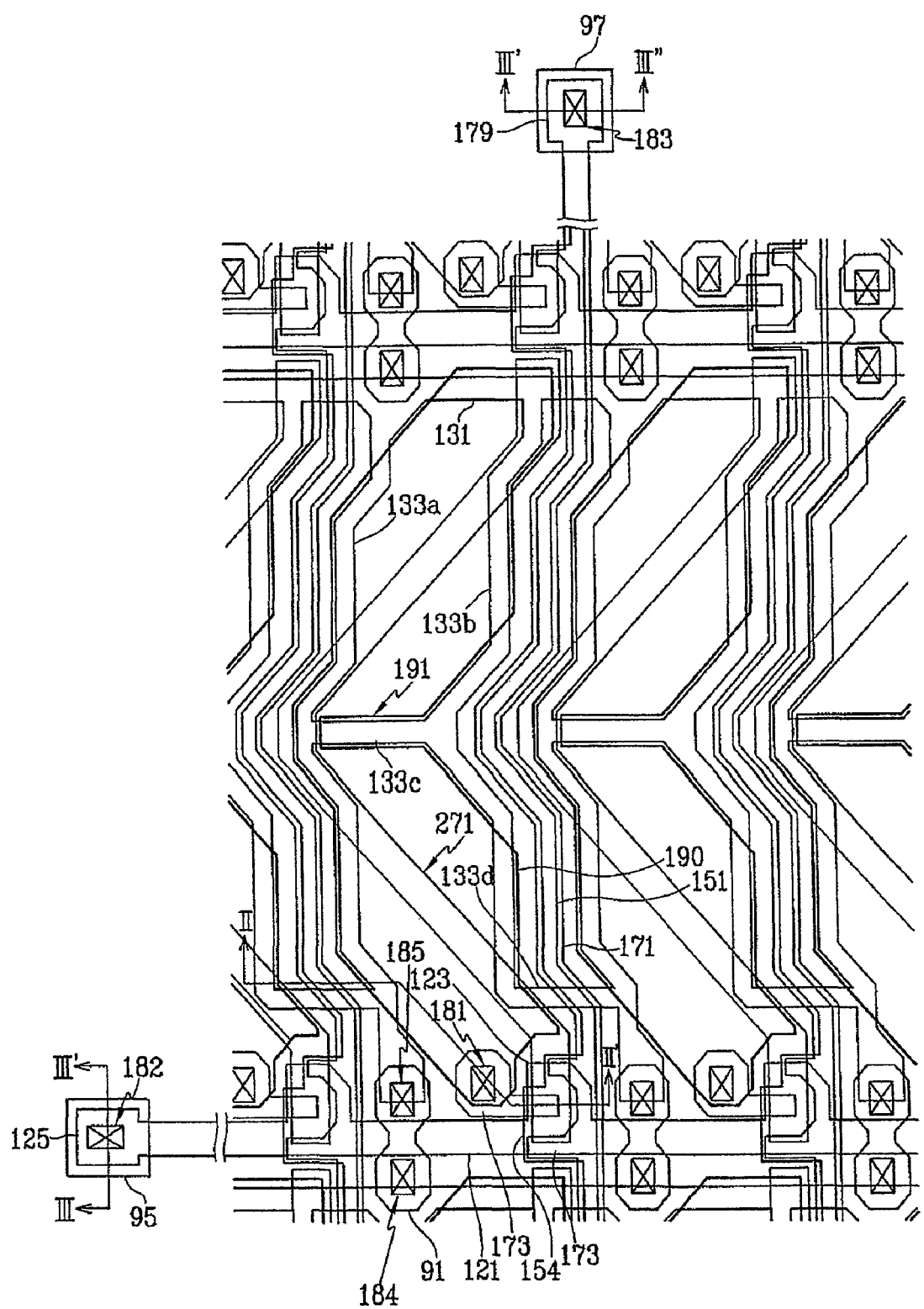
FIG. 1 is a layout view of an LCD according to an exemplary embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, TFT array panels and manufacturing methods thereof according to exemplary embodiments of the present invention will be described with reference to the accompanying drawings.

Figure 2:
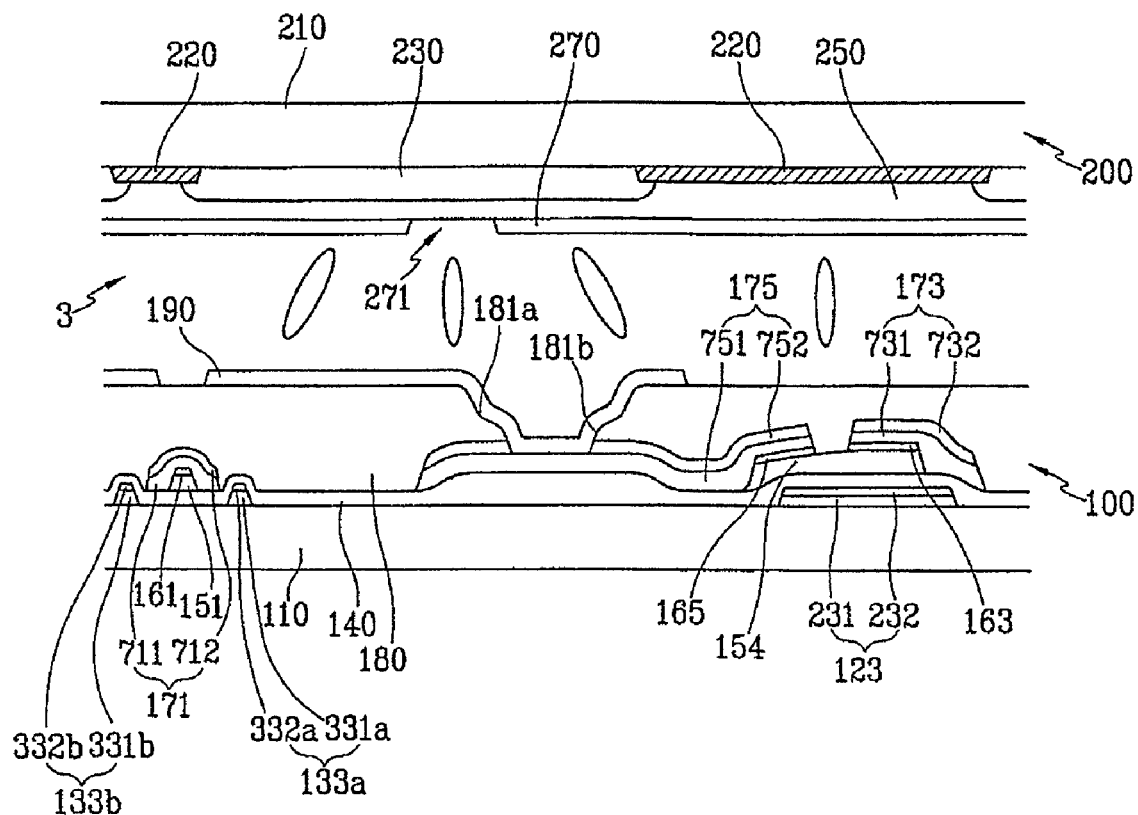
FIG. 2 is a sectional view of the LCD shown in FIG. 1 taken along the line II-II'.
Figure 3:
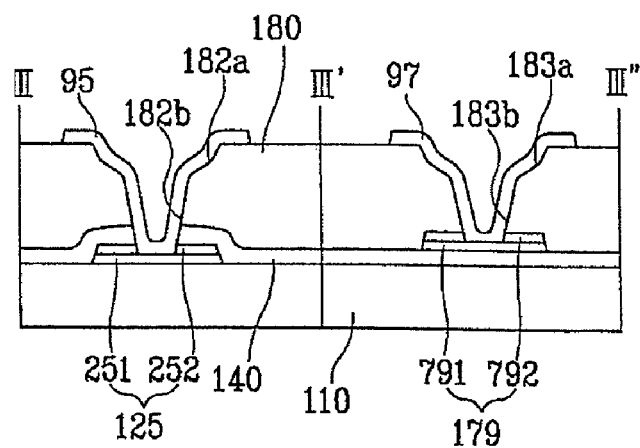
FIG. 3 is a sectional view of the LCD shown in FIG. 1 taken along the lines III-III' and III'-III''.

FIG. 1 is a layout view of an LCD according to an exemplary embodiment of the present invention, FIG. 2 is a sectional view of the LCD shown in FIG. 1 taken along the line II-II', and FIG. 3 is a sectional view of the LCD shown in FIG. 1 taken along the lines III-III' and III'-III".

Referring to FIGS. 1-3, an LCD according to an exemplary embodiment of the present invention includes a TFT array panel 100, a common electrode panel 200, and a LC layer 3 interposed between the panels 100 and 200. The LC layer 3 contains a plurality of LC molecules aligned vertical to surfaces of the panels 100 and 200.

The TFT array panel 100 is now described in detail.

A plurality of gate lines 121 and a plurality of storage electrode lines 131 are formed on an insulating substrate 110.

The gate lines 121 extend substantially in a transverse direction and are separated from each other. The gate lines 121 transmit gate signals. A plurality of projections of each gate line 121 forms a plurality of gate electrodes 123. Each gate line 121 has an expansion 125 for contact with another layer or an external device.

Each storage electrode line 131 extends substantially in the transverse direction and includes a plurality of sets of storage electrodes including a pair of longitudinal storage electrodes 133a and 133b and a transverse storage electrode 133c connecting the curved longitudinal storage electrodes 133a and 133b, and a plurality of connectors 133d connecting two storage electrodes 133a and 133b in neighboring sets of storage electrodes 133a-133c. The longitudinal storage electrodes 133a and 133b periodically curve and each of the longitudinal storage electrodes 133a has a free end portion and a fixed end portion connected to the storage electrode line 131, and both of the end portions have inclined edges. Each of the longitudinal storage electrodes 133b has two end portions, one connected to the storage electrode line 131 and the other connected to the connector 133d. The storage electrode lines 131 are supplied with a predetermined voltage such as a common voltage, which is applied to a common electrode 270 on the common electrode panel 200 of the LCD.

The gate lines 121 as well as the storage electrode lines 131 include a lower film and an upper film. The lower film and the upper film have different physical characteristics. The upper film is preferably made of low resistivity metal including Al containing metal such as Al and Al alloy for reducing signal delay or voltage drop in the gate lines 121 and the storage electrode lines 131. On the other hand, the lower film is preferably made of material such as Cr, Mo and Mo alloy, which has good contact characteristics with other materials such as indium tin oxide (ITO) or indium zinc oxide (IZO). A good exemplary combination of the lower film material and the upper film material is Cr and Al—Nd alloy. In FIGS. 2 and 3, the lower and the upper films of the gate electrodes 123 are indicated by reference numerals 231 and 232, respectively, the lower and the upper films of the expansions 125 of the gate lines 121 are indicated by reference numerals 251 and 252, respectively, the lower and the upper films of the curved longitudinal storage electrodes 133a are indicated by reference numerals 331a and 332a, respectively, and the lower and the upper films of the curved longitudinal storage electrodes 133b are indicated by reference numerals 331b and 332b, respectively. Portions of the upper films 252 of the expansions 125 of the gate lines 121 are removed to expose the underlying portions of the lower films 251.

In various exemplary embodiments of the invention, the gate lines 121 and the storage electrode lines 131 may have a single layered or multi-layered (i.e., triple or more layered) structure.

In addition, the edge surfaces of the gate lines 121 and the storage electrode lines 131 are tapered, and the inclination angle of the edge surfaces with respect to a surface of the substrate 110 is in a range of about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") is formed on the gate insulating layer 140. Each semiconductor stripe 151 extends substantially in the longitudinal direction and is curved periodically. Each semiconductor stripe 151 has a plurality of projections 154 branched out toward the gate electrodes 123. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The edge surfaces of the semiconductor stripes 151 and the ohmic contacts 161 and 165 are tapered, and the inclination angles of the edge surfaces of the semiconductor stripes 151 and the ohmic contacts 161 and 165 are preferably in a range of about 30-80 degrees.

A plurality of data lines 171 and a plurality of drain electrodes 175 are formed on the ohmic contacts 161 and 165 and the gate insulating layer 140.

The data lines 171 for transmitting data voltages extend substantially in the longitudinal direction and intersect the gate lines 121 to define pixel areas arranged in a matrix. Each data line 171 curves periodically and includes a plurality of sets of five longitudinal portions and four oblique portions connected between the longitudinal portions. The upper two of the four oblique portions make a counterclockwise angle of about 45 degrees with the gate lines 121, and the lower two of the four oblique portions make a clockwise angle of about 45 degrees with the gate lines 121. Therefore, the data lines 171 step toward the left side, and then they return stepwise to their initial positions. In addition, for example, two pairs of the oblique portions may have symmetry with respect to a horizontal line. Also, for example, the storage electrodes 133a and 133b may be parallel to the oblique portions and/or the vertical portions of the data line 171.

Therefore, each pixel area has a shape of a multi-bent band. The curvature of the semiconductor stripes 151 and the ohmic contact stripes 161 overlapping the data lines 171 follows that of the data lines 171. Furthermore, the curvature of the curved longitudinal storage electrodes 133a and 133b also follows that of the data lines 171.

Each data line 171 includes an expansion 179 having a wider width for contact with another layer or an external device. A plurality of branches of each data line 171, which project toward the drain electrodes 175, form a plurality of source electrodes 173. Each pair of the source electrodes 173 and the drain electrodes 175 is separated from each other and opposite each other with respect to a gate electrode 123. A gate electrode 123, a source electrode 173, and a drain electrode 175 along with a projection 154 of a semiconductor stripe 151 forms a TFT having a channel formed in the projection 154 disposed between the source electrode 173 and the drain electrode 175.

The data lines 171 and the drain electrodes 175 also include a lower film 711 and 751, respectively, preferably made of Mo, Mo alloy or Cr and an upper film 712 and 752, respectively, located thereon and preferably made of Al containing metal or Ag containing metal. In FIGS. 2 and 3, the lower and the upper films of the source electrodes 173 are indicated by reference numerals 731 and 732, respectively, and the lower and the upper films of the expansions 179 of the data lines 171 are indicated by reference numerals 791 and 792, respectively. Portion of the upper films 792, 752 of the expansions 179 of the data lines 171 and the drain electrodes 175 are removed to expose the underlying portions of the lower films 791 and 751.

The lower films 711 and 751 and the upper films 712 and 752 of the data lines 171 and the drain electrodes 175 have tapered edge surfaces, and the inclination angles of the edge surfaces are in a range of about 30-80 degrees.

A passivation layer 180 preferably made of organic insulator such as a photosensitive material is formed on the data lines 171 and the drain electrodes 175. The passivation layer 180 made of a photosensitive material can be patterned by exposure and development without an etching process. Alternatively, the passivation layer 180 may be made of a photo-insensitive organic material or an inorganic material such as $SiO_2$ and SiNx.

The passivation layer 180 has a plurality of contact holes 181 and 183 exposing the lower films 751 of the drain electrodes 175 and the lower films 791 of the expansions 179 of the data lines 171, respectively. The passivation layer 180 and the gate insulating layer 140 have a plurality of contact holes 182, 184 and 185 exposing the expansions 125 of the gate lines 121, portions of the storage electrode lines 131 near the fixed end portions of the first storage electrodes 133a, and the free end portions of the first storage electrodes 133a, respectively. The sidewalls of the contact holes 181, 182, 183 as well as the contact holes 184 and 185 make an angle of about 30-85 degrees with respect to the surface of the substrate 110 and have stepped profiles including lower stairs 181b, 182b and 183b and upper stairs 181a, 182a and 183a as shown in FIGS. 2 and 3.

The contact holes 181-185 may have various planar shapes, such as a rectangular shape and a circular shape.

A plurality of pixel electrodes 190, a plurality of contact assistants 95 and 97, and a plurality of storage connecting bridges 91, which are preferably made of ITO or IZO, are formed on the passivation layer 180.

The pixel electrodes 190 are physically and electrically connected to the drain electrodes 175 through the contact holes 181 such that the pixel electrodes 190 receive the data voltages from the drain electrodes 175.

Each pixel electrode 190 has a shape of a multi-bent band following that of the pixel area. Each of the pixel electrodes 190 has a transverse cutout 191 that divide the pixel electrodes 190 into upper and lower portions. In addition, for example, the pixel electrode 190 includes at least one edge parallel to one of the bent portions (e.g. oblique portions) or one of the longitudinal portions of the data line 171.

The storage connecting bridges 91 cross over the gate lines 121 and physically and electrically connect neighboring storage electrode lines 131 through the contact holes 184 and 185. A conductor piece (not shown) may be disposed under each storage connecting bridge 91. The storage connecting bridges 91 electrically connect all of the storage electrode lines 131 on the substrate 110. The storage lines 131 and the storage bridges 91 can be used for repairing defects of the gate lines 121 and the data lines 171. The conducting pieces may enhance electrical connection between the gate lines 121 and the storage connection bridge 91 when a laser beam is illuminated on the TFT array panel to repair defects.

The description of the common electrode panel 200 follows.

A black matrix 220 for preventing light leakage is formed on an insulating substrate 210 such as transparent glass.

A plurality of red, green and blue color filters 230 are formed on the black matrix and the substrate 210 and extend substantially along the columns of the pixel areas such that they periodically curve.

An overcoat 250 is formed on the color filters 230 and the black matrix 220. A common electrode 270 preferably made of transparent conductive material such as ITO and IZO is formed on the overcoat 250. The common electrode 270 has a plurality of cutouts 271. Moreover, for example, the cutouts 271 may include a pair of upper bent portions and a upper vertical portion Each of the cutouts 271 of the common electrode 270 is curved such that each of the upper and the lower portions of the pixel electrodes 190 are obliquely partitioned into two pieces. As shown in FIG. 1, each of the cutouts 271 of the common electrode 270 cuts across the upper portion of a corresponding pixel electrode 190 in a first direction and cuts across the lower portion of the corresponding pixel electrode 190 in a second direction opposite to the first direction. The cutout 271 has end portions that are elongated in the longitudinal direction. In addition, for example, an upper vertical portion (e.g. longitudinal portion) of the data lines 171 may be disposed near the vertical portion located in the middle among three of the vertical portions of the data lines 171 and connected to the pair of upper bent portions of the cutouts 271 at each end.

The overcoat 250 prevents the color filters 230 from being exposed through the cutouts 271 of the common electrode 270 to contaminate the LC layer 3.

A homogeneous or homeotropic alignment layer (not shown) is coated on the common electrode 270.

A pair of polarizers (not shown) is provided on outer surfaces of the panels 100 and 200 such that their transmissive axes are crossed and one of the transmissive axes is parallel to the gate lines 121.

The LCD may further include at least one retardation film for compensating the retardation of the LC layer 3.

The LC molecules in the LC layer 3 are aligned such that their long axes are vertical to the surfaces of the panels 100 and 200. The LC layer 3 has negative dielectric anisotropy.

Upon application of a common voltage to the common electrode 270 and a data voltage to the pixel electrodes 190, an electric field substantially perpendicular to the surfaces of the panels 100 and 200 is generated. The LC molecules tend to change their orientations in response to the electric field such that their long axes are perpendicular to the field direction. In the meantime, the cutouts 271 of the common electrode 270 and the edges of the pixel electrodes 190 distort the electric field to have a horizontal component, which determines the tilt directions of the LC molecules. The horizontal component of the electric field is perpendicular to the edges of the cutouts 271 and the edges of the pixel electrodes 190. Accordingly, four domains having different tilt directions are formed in the LC layer 3.

As described above, since the area occupied by the cutouts 191 and 271 is reduced, the aperture ratio of the LCD is increased.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200, thereby reducing the production cost.

The resistance increases of the data lines 171 due to their curving shape can be compensated by widening the data lines 171. Further, distortion of the electric field and increase of the parasitic capacitance due to the increase of the width of the data lines 171 can be compensated by maximizing the size of the pixel electrodes 190 and by adapting a thick organic passivation layer.

A method of manufacturing the TFT array panel shown in FIGS. 1, 2 and 3 according to an embodiment of the present invention will be now described in detail.

FIGS. 4A, 4B, 5A and 5B are sectional views of the TFT array panel shown in FIGS. 1-3 during various steps of a manufacturing method thereof according to an embodiment of the present invention.

Figure 4A:
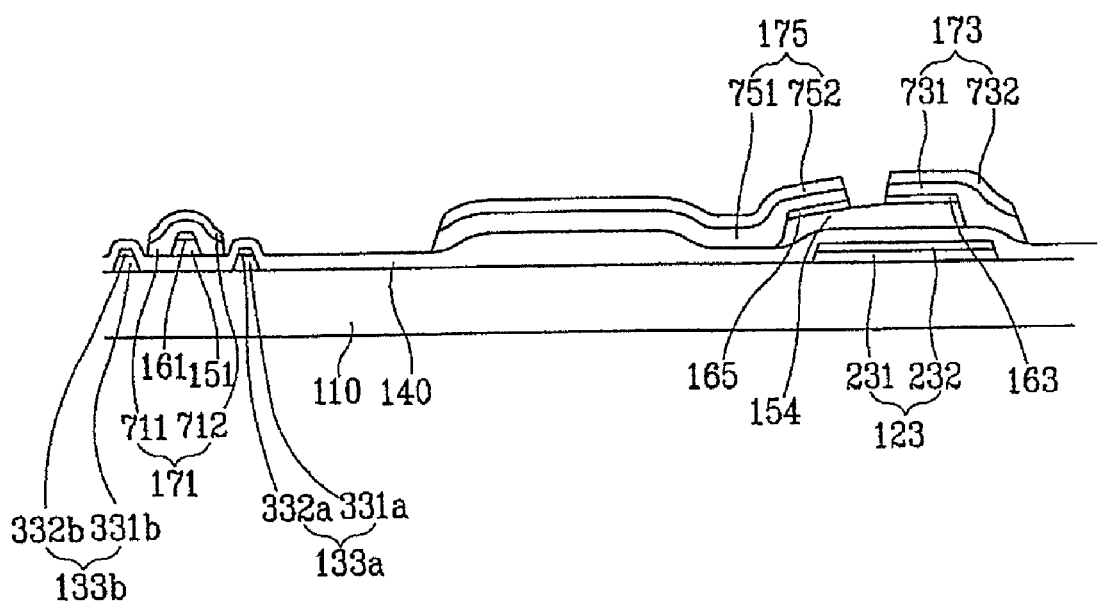
FIGS. 4A, 4B, 5A and 5B are sectional views of the TFT array panel shown in FIGS. 1-3 during various steps of a manufacturing method thereof according to an exemplary embodiment of the present invention.
Figure 4B:
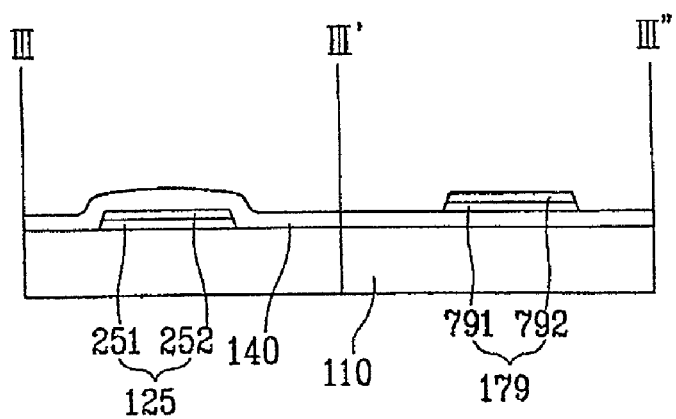

Referring to FIGS. 4A and 4B, a lower conductive film and an upper conductive film are sputtered in sequence on an insulating substrate 110 such as transparent glass and wet or dry etched in sequence to form a plurality of gate lines 121 and a plurality of storage electrode lines 131.

After sequential deposition of a gate insulating layer 140 having a thickness of about 1,500 to about 5,000 Å, an intrinsic a-Si layer having a thickness of about 500 to about 2,000 Å, and an extrinsic a-Si layer having a thickness of about 300 to about 600 Å, the extrinsic a-Si layer and the intrinsic a-Si layer are photo-etched to form a plurality of extrinsic semiconductor stripes and a plurality of intrinsic semiconductor stripes 151 including a plurality of projections 154 on the gate insulating layer 140.

A lower conductive film and an upper conductive film each having a thickness of about 1,500 to about 3,000 Å are sputtered in sequence and are patterned to form a plurality of data lines 171 including a plurality of source electrodes 173 and a plurality of drain electrodes 175.

Thereafter, portions of the extrinsic semiconductor stripes, which are not covered with the data lines 171 and the drain electrodes 175 are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows thereafter to stabilize the exposed surfaces of the semiconductor stripes 151.

Figure 5A:
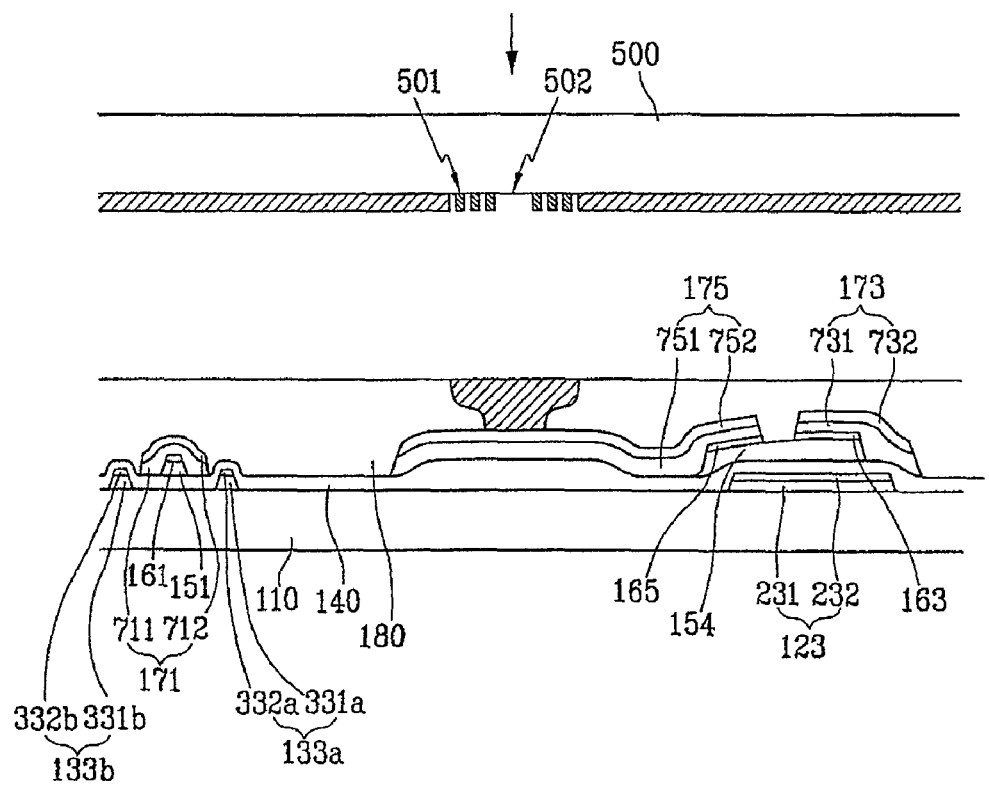
Figure 5B:
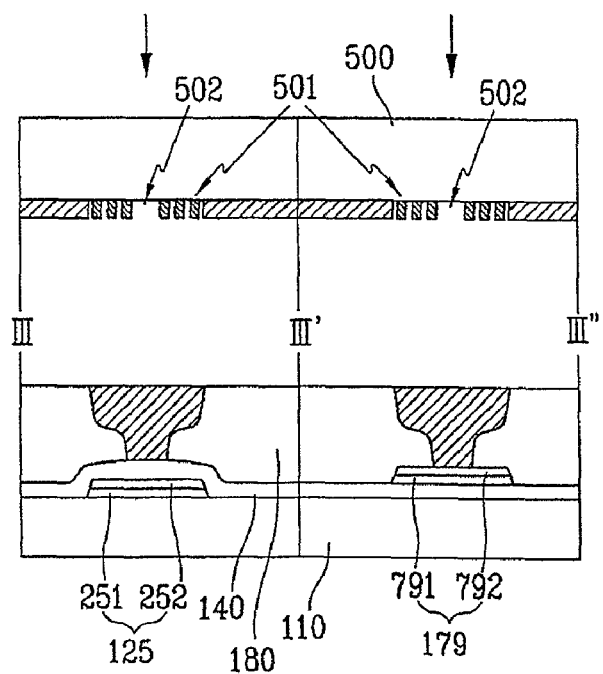

Referring to FIGS. 5A and 5B, a passivation layer 180 made of a photosensitive organic insulator is coated and exposed through a photo-mask 500 having a plurality of transmissive areas 502 and a plurality of slit areas 501 disposed around the transmissive areas 502.

Accordingly, portions of the passivation layer 180 facing the transmissive areas 502 absorb the full energy of the light, while portions of the passivation layer 180 facing the slit areas 501 partially absorb the light energy.

Subsequently, the passivation layer 180 is developed to form a plurality of contact holes 181-185. The portions of the passivation layer 180 facing the transmissive areas 502 are removed to their full thickness, while the portions facing the slit areas 501 remain to have reduced thickness, so that the contact holes 181-185 have stepped profiles.

Next, exposed portions of the upper conductive films 752, 792 and 252 of the drain electrodes 175, the expansions 179 of the data lines 171, and the expansions 125 of the gate lines 121, respectively, as well as the upper conductive films of the storage electrode lines 131 are removed by etching.

An ITO or IZO film is deposited to a thickness of about 400 Å to about 500 Å and photo-etched to form a plurality of pixel electrodes 190, a plurality of contact assistants 95 and 97, and a plurality of storage connecting bridges 91.

A TFT array panel for an LCD according to another embodiment of the present invention will be described in detail with reference to FIGS. 6 to 11B.

Figure 6:
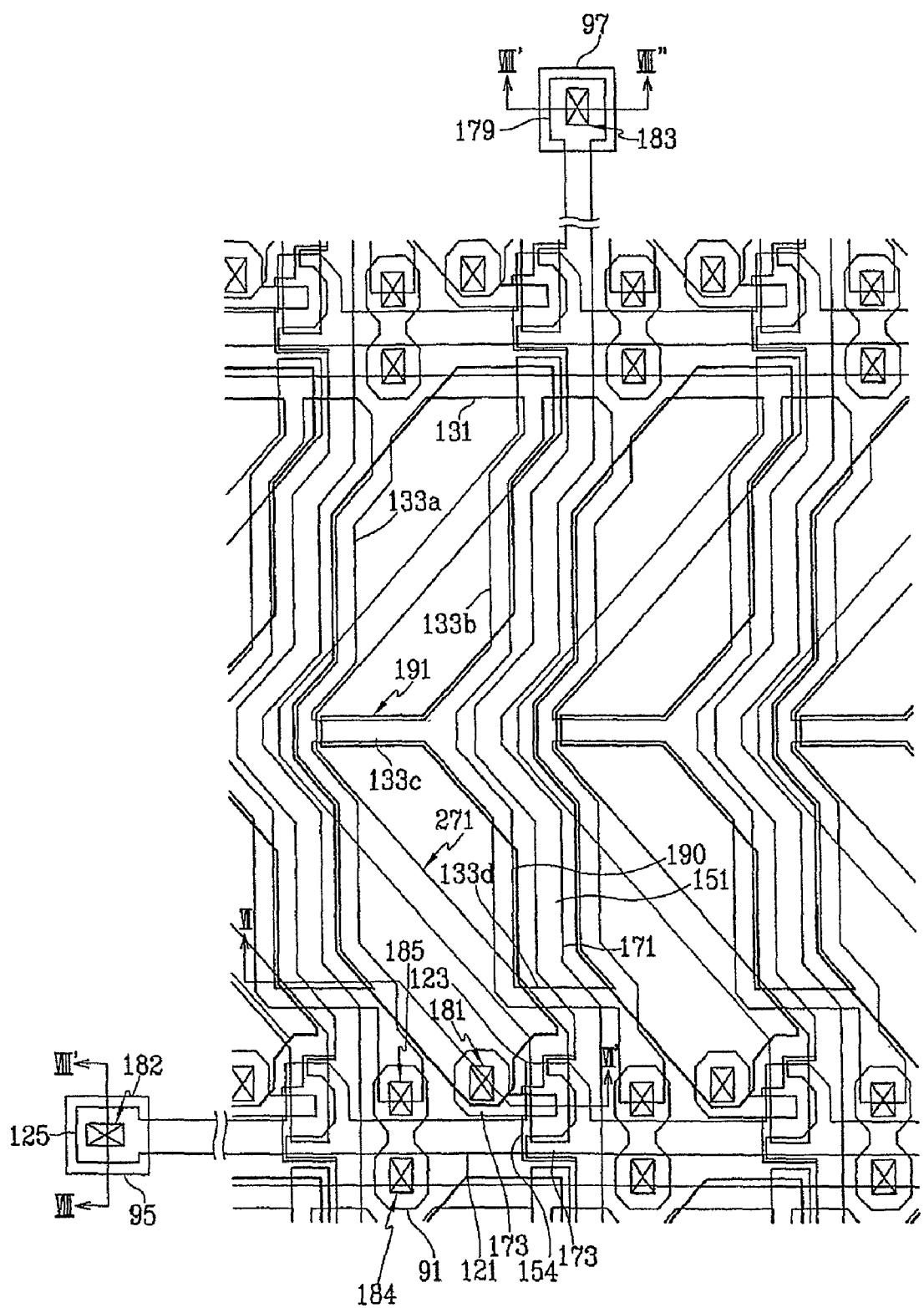
FIG. 6 is a layout view of an LCD according to another exemplary embodiment of the present invention.
Figure 7:
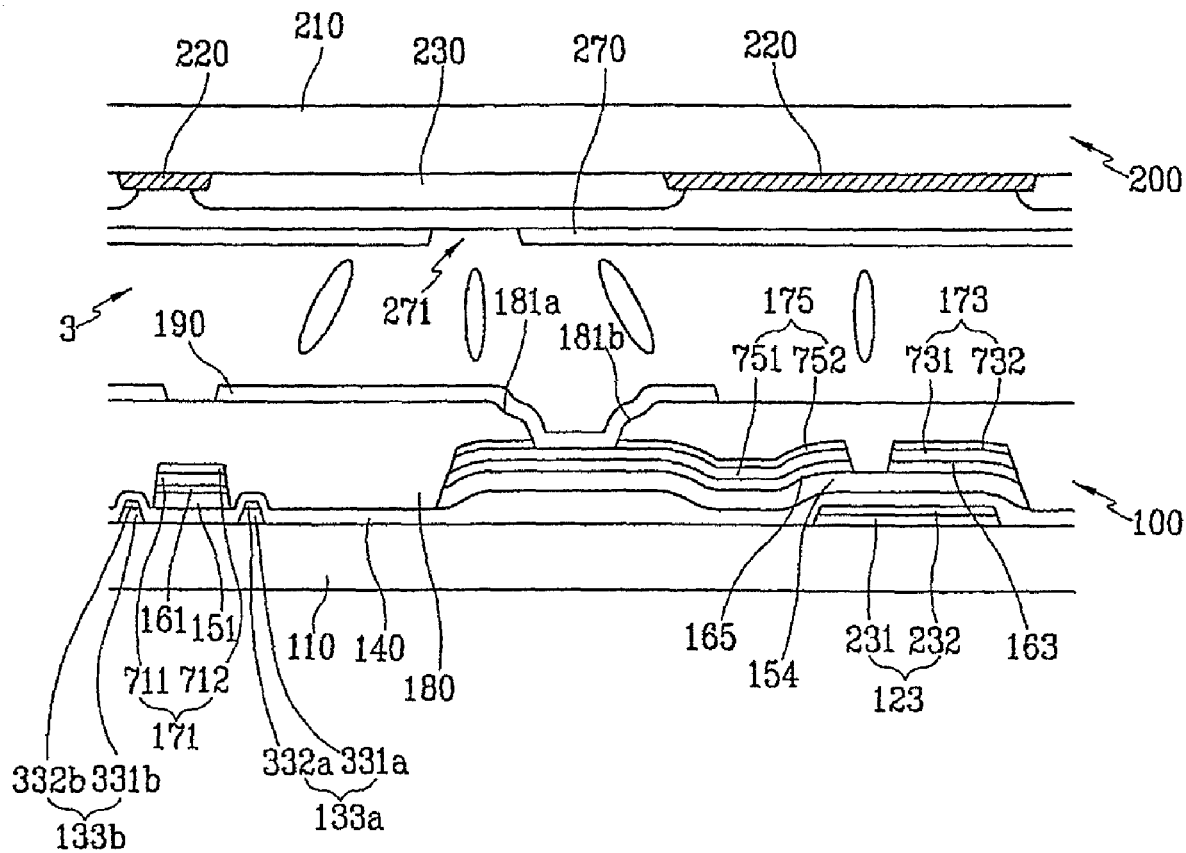
FIG. 7 is a sectional view of the LCD shown in FIG. 6 taken along the line VII-VII'.
Figure 8:
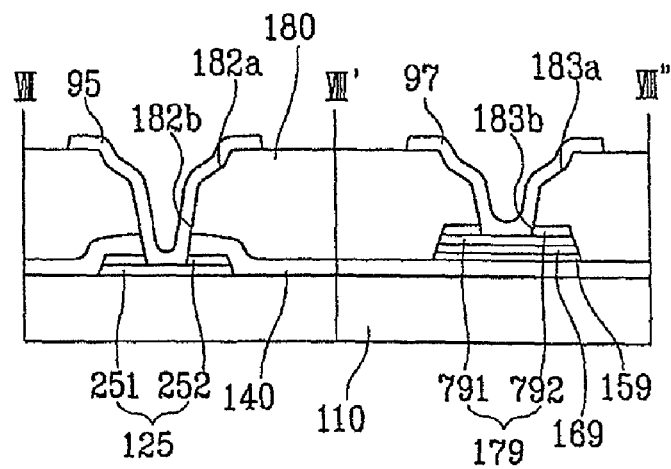
FIG. 8 is a sectional view of the LCD shown in FIG. 6 taken along the lines VIII-VIII' and VIII'-VIII''.

FIG. 6 is a layout view of an LCD according to another embodiment of the present invention, FIG. 7 is a sectional view of the LCD shown in FIG. 6 taken along the line VII-VII', and FIG. 8 is a sectional view of the LCD shown in FIG. 6 taken along the lines VIII-VIII' and VIII'-VIII".

Referring to FIGS. 6-8, an LCD according to the present embodiment of the invention includes a TFT array panel 100, a common electrode panel 200, and a LC layer 3 interposed therebetween.

Layered structures of the panels 100 and 200 according to the present embodiment of the invention are similar to those of the previous embodiment.

Regarding the TFT array panel 100, a plurality of gate lines 121 including a plurality of gate electrodes 123 and a plurality of storage electrode lines 131 including a plurality of storage electrodes 133a-133c and a plurality of storage connectors 133d are formed on a substrate 110. A gate insulating layer 140 is formed on the gate lines 121 and the storage electrode lines 131, and a plurality of semiconductor stripes 151 including a plurality of projections 154, and a plurality of ohmic contact stripes 161 including a plurality of projections 163 and a plurality of ohmic contact islands 165 are sequentially formed on the gate insulating layer 140. A plurality of data lines 171 including a plurality of source electrodes 173 and a plurality of drain electrodes 175 are formed on the ohmic contacts 161 and 165, and a passivation layer 180 is formed thereon. A plurality of contact holes 181-185 are provided at the passivation layer 180 and the gate insulating layer 140, and a plurality of pixel electrodes 190, a plurality of contact assistants 95 and 97, and a plurality of storage connecting bridges 91 are formed on the passivation layer 180.

Regarding the common electrode panel 200, a plurality of red, green and blue color filters 230 and a black matrix 220 for preventing light leakage are formed on an insulating substrate 210. An overcoat 250 is formed on the color filters 230 and the black matrix 220, and a common electrode 270 is formed on the overcoat 250.

Different from the LCD shown in FIGS. 1-3, the semiconductor stripes 151 have substantially the same planar shapes as the data lines 171 and the drain electrodes 175 as well as the overlaying ohmic contacts 161 and 165, except for the projections 154 where TFTs are provided. In detail, the projections 154 include some exposed portions, which are not covered with the data lines 171 and the drain electrodes 175 such as portions located between the source electrodes 173 and the drain electrodes 175.

Now, a method of manufacturing the TFT array panel shown in FIGS. 6 to 8 according to an embodiment of the present invention will be described in detail.

FIGS. 9A, 9B, 10A, 10B, 11A and 11B are sectional views of the TFT array panel shown in FIG. 6-8 during various steps of a manufacturing method thereof according to an embodiment of the present invention.

Figure 9A:
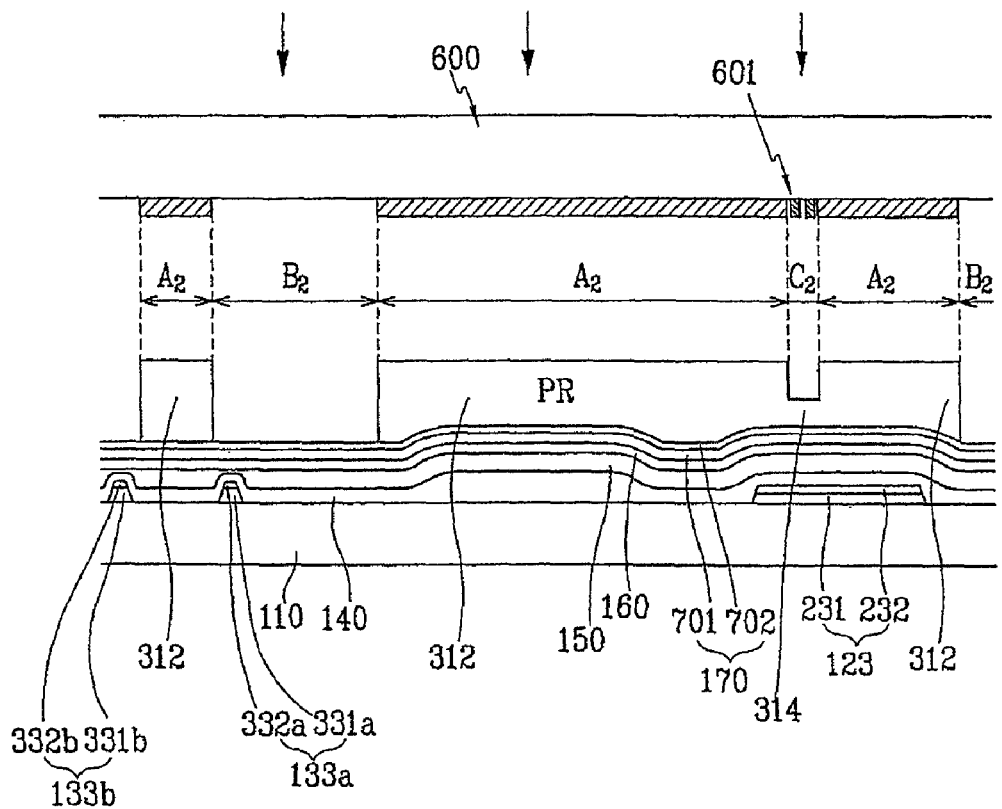
FIGS. 9A, 9B, 10A, 10B, 11A and 11B are sectional views of the TFT array panel shown in FIGS. 6-8 during various steps of a manufacturing method thereof according to an exemplary embodiment of the present invention.
Figure 9B:
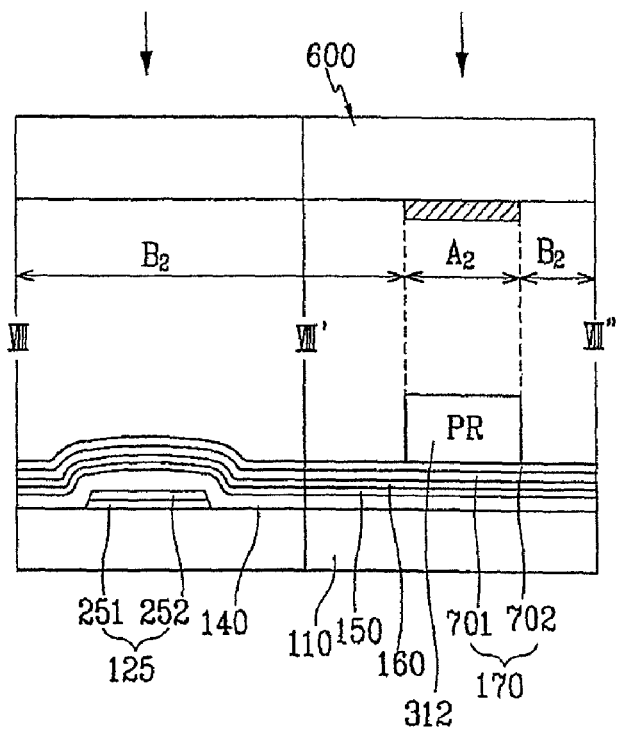

Referring to FIGS. 9A and 9B, a lower conductive film and an upper conductive film are sputtered in sequence on an insulating substrate 110 such as transparent glass and wet or dry etched in sequence to form a plurality of gate lines 121 and a plurality of storage electrode lines 131.

Next, a gate insulating layer 140, an intrinsic a-Si layer 150, and an extrinsic a-Si layer 160 are sequentially deposited by CVD to thicknesses of about 1,500 to about 5,000 Å, about 500 to about 2,000 Å and about 300 to about 600 Å, respectively. A conductive layer 170 including a lower film 701 and an upper film 702 is deposited by sputtering, and a photoresist film with a thickness of about 1 to about 2 microns is coated on the conductive layer 170.

The photoresist film is exposed to light through an exposure mask 600 including slit areas 601, and developed such that the developed photoresist PR has a position dependent thickness. The photoresist shown in FIGS. 9A and 9B includes a plurality of first to third portions with decreased thickness. The first portions are located on wire areas A2 and the second portions are located on channel areas C2, while the third portions located on remaining areas B2 are not illustrated in the figures since they have substantially zero thickness to expose underlying portions of the conductive layer 170.

Figure 10A:
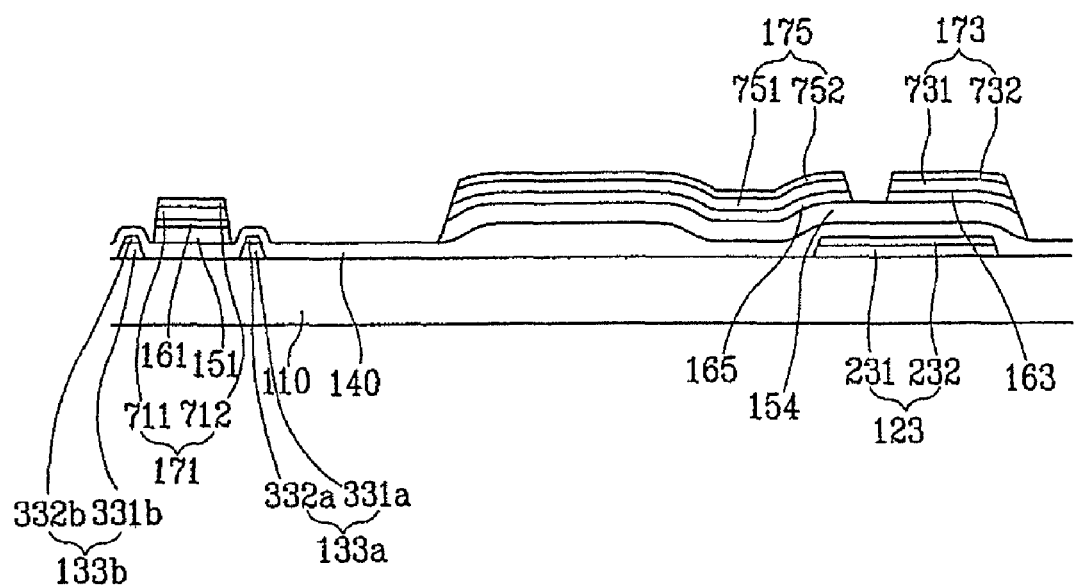
Figure 10B:
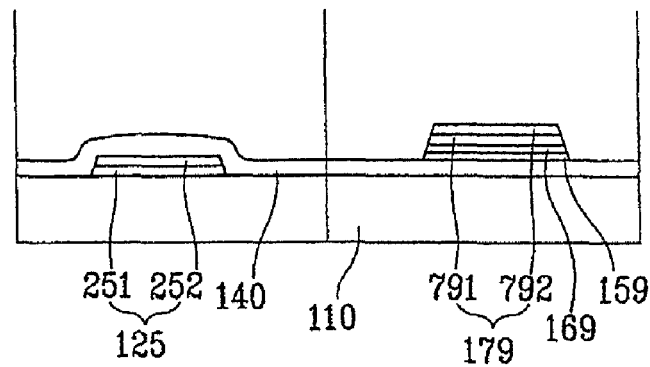

The varying thickness of the photoresist PR enables selective etching of the underlying layers when using suitable process conditions. Therefore, a plurality of data lines 171 including a plurality of source electrodes 173, and a plurality of drain electrodes 175 as well as a plurality of ohmic contact stripes 161 including a plurality of projections 163, a plurality of ohmic contact islands 165 and a plurality of semiconductor stripes 151 including a plurality of projections 154 are obtained by a series of etching steps as shown in FIGS. 10A and 10B.

For descriptive purpose, portions of the conductive layer 170, the extrinsic a-Si layer 160, and the intrinsic a-Si layer 150 on the wire areas A2 are called first portions, portions of the conductive layer 170, the extrinsic a-Si layer 160, and the intrinsic a-Si layer 150 on the channel areas C2 are called second portions, and portions of the conductive layer 170, the extrinsic a-Si layer 160, and the intrinsic a-Si layer 150 on the remaining areas B2 are called third portions.

An exemplary sequence of forming such a structure is as follows:

(1) Removal of third portions of the conductive layer 170, the extrinsic a-Si layer 160 and the intrinsic a-Si layer 150 on the remaining areas B2;

(2) Removal of the second portions of the photoresist;

(3) Removal of the second portions of the conductive layer 170 and the extrinsic a-Si layer 160 on the channel areas C2; and (4) Removal of the first portions of the photoresist.

Another exemplary sequence is as follows:

(1) Removal of the third portions of the conductive layer 170;

(2) Removal of the second portions of the photoresist;

(3) Removal of the third portions of the extrinsic a-Si layer 160 and the intrinsic a-Si layer 150;

(4) Removal of the second portions of the conductive layer 170;

(5) Removal of the first portions of the photoresist; and (6) Removal of the second portions of the extrinsic a-Si layer 160.

The first example is described in detail below.

At first, the exposed third portions of the conductive layer 170 on the remaining areas B2 are removed by wet etching or dry etching to expose the underlying third portions of the extrinsic a-Si layer 160. The dry etching may etch out the top portions of the photoresist PR.

Next, the third portions of the extrinsic a-Si layer 160 and the intrinsic a-Si layer 150 are removed preferably by dry etching and the second portions of the photoresist PR are removed to expose the second portions of the conductive layer 170. The removal of the second portions of the photoresist PR are performed either simultaneously with or independent from the removal of the third portions of the extrinsic a-Si layer 160 and the intrinsic a-Si layer 150. A gas mixture of $SF_6$ and HCl or a gas mixture of $SF_6$ and $O_2$ can etch the a-Si layers 150 and 160 and the photoresist PR by nearly the same etching ratio. Residue of the second portions of the photoresist PR remaining on the channel areas C2 is removed by ashing. The semiconductor stripes 151 are completed in this step.

Next, the second portions of the conductive layer 170 and the extrinsic a-Si layer 160 on the channel areas C2 as well as the first portion of the photoresist PR are removed.

Both the conductive layer 170 and the extrinsic a-Si 160 may be dry etched.

Alternatively, the conductive layer 170 may be wet etched, while the extrinsic a-Si layer 160 is dry etched. The wet etch etches out lateral sides of the conductive layer 170, while the dry etch minimally etches out lateral sides of the extrinsic a-Si layer 160, so that step-wise lateral profiles are obtained. Examples of the gas mixtures are $CF_4$ and HCl and $CF_4$ and $O_2$, as described above. The latter gas mixture leaves uniform thickness of the intrinsic semiconductor stripes 151.

In this way, the conductive layer 170 is divided into a data line 171 and a plurality of drain electrodes 175, and the extrinsic a-Si layer 160 is divided into an ohmic contact stripe 161 and a plurality of ohmic contact islands 165.

Figure 11A:
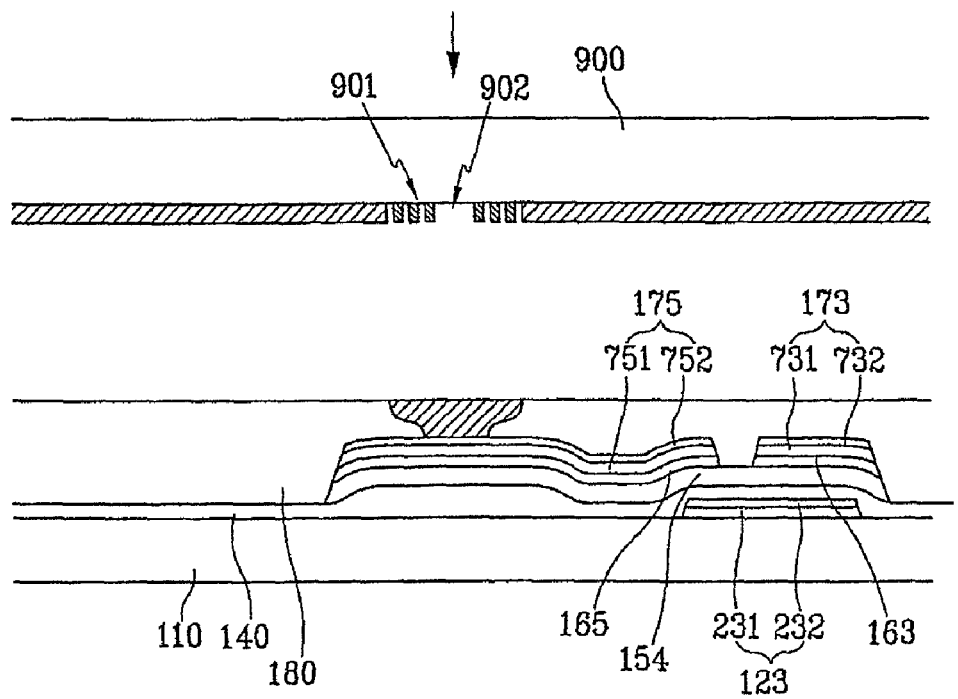
Figure 11B:
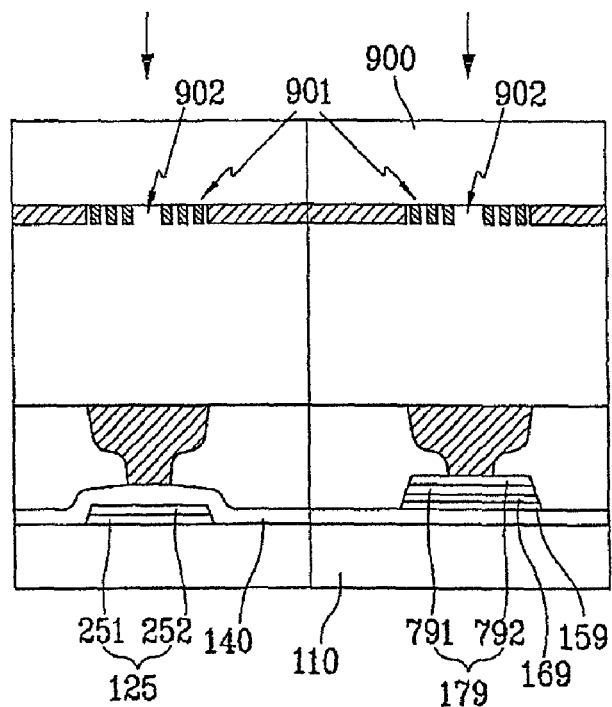

Referring to FIGS. 11A and 11B, a passivation layer 180 made of a photosensitive organic insulator is coated and exposed through a photo-mask 900 having a plurality of transmissive areas 902 and a plurality of slit areas 901 disposed around the transmissive areas 902. Accordingly, portions of the passivation layer 180 facing the transmissive areas 902 absorb the full energy of the light, while portions of the passivation layer 180 facing the slit areas 901 partially absorb the light energy.

Subsequently, the passivation layer 180 is developed to form a plurality of contact holes 181-185. The portions of the passivation layer 180 facing the transmissive areas 902 are removed to their full thickness, while the portions facing the slit areas 901 remain to have reduced thickness, so that the contact holes 181-185 have stepped profiles.

The passivation layer 180 may be made of a photo-insensitive organic insulator. Alternatively, the passivation layer 180 may be made of an inorganic insulator having a low dielectric constant under 4, in which case an additional etching step for forming the contact holes 181-185 is required.

Referring to FIGS. 6 to 8, exposed portions of the upper conductive films 752, 792 and 252 of the drain electrodes 175, the expansions 179 of the data lines 171 and the expansions 125 of the gate lines 121, respectively, as well as the upper conductive films of the storage electrode lines 131 are removed by etching.

A plurality of pixel electrodes 190, a plurality of contact assistants 95 and 97, and a plurality of storage connecting bridges 91 are formed by depositing and photo-etching an ITO or IZO film having a thickness of about 400 Å to about 500 Å.

The etching of the IZO film may include wet etching using a Cr etchant such as $HNO_3/(NH_4)_2Ce(NO_3)_6/H_2O$, which does not erode the exposed Al portions of the data lines 171, the drain electrodes 175, the gate lines 121, and the storage electrode lines 131 through the contact holes 181-185. A preferred deposition temperature for minimizing the contact resistance ranges from room temperature to about 200° C. A sputtering target for depositing IZO preferably includes $In_2O_3$ and ZnO and the content of ZnO is preferably in a range about 15 to about 20 atomic %.

Nitrogen, which can prevent the formation of metal oxides on the exposed portions of the drain electrodes 175, the gate lines 121, the data lines 171, and the storage electrode lines 131 through the contact holes 181-185, is preferably used in a pre-heating process before the deposition of the ITO film or the IZO film.

Figure 12:
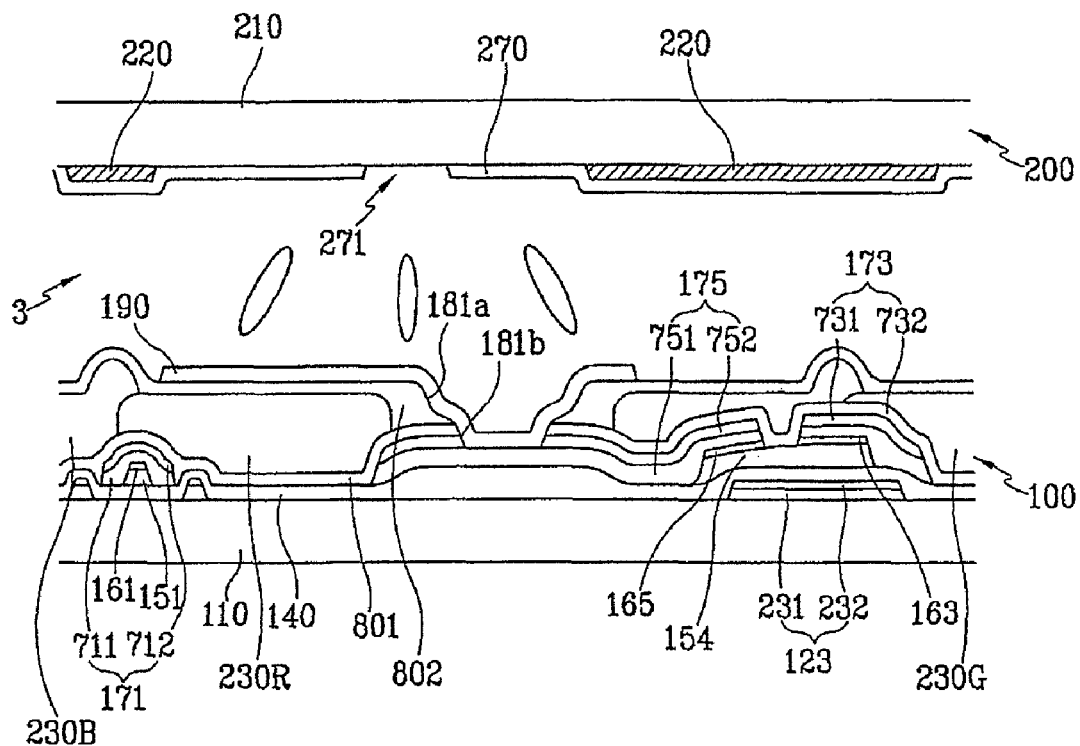
FIGS. 12 and 13 are sectional views of an LCD according to another exemplary embodiment of the present invention.
Figure 13:
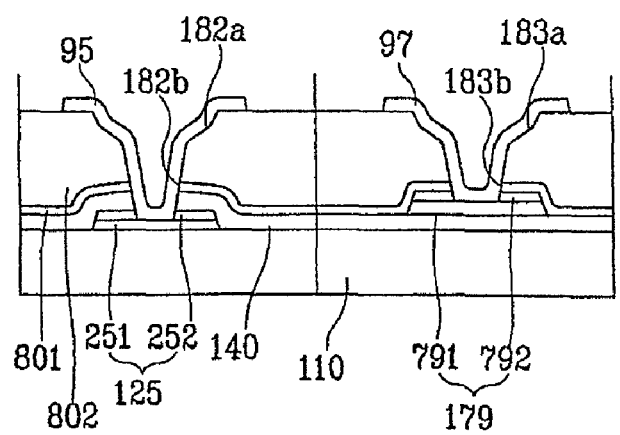

FIGS. 12 and 13 are sectional views of an LCD according to another embodiment of the present invention.

Referring to FIGS. 12 and 13, an LCD according to the present embodiment of the invention includes a TFT array panel 100, a common electrode panel 200, and a LC layer 3 interposed therebetween.

Regarding the TFT array panel 100, a plurality of gate lines 121 including a plurality of gate electrodes 123 and a plurality of storage electrode lines 131 including a plurality of storage electrodes 133a-133c and a plurality of storage connectors 133d are formed on a substrate 110. A gate insulating layer 140 is formed on the gate lines 121 and the storage electrode lines 131, and a plurality of semiconductor stripes 151 including a plurality of projections 154, and a plurality of ohmic contact stripes 161 including a plurality of projections 163 and a plurality of ohmic contact islands 165 are sequentially formed on the gate insulating layer 140. A plurality of data lines 171 including a plurality of source electrodes 173 and a plurality of drain electrodes 175 are formed on the ohmic contacts 161 and 165 and the gate insulating layer 140.

A first passivation layer 801 preferably made of inorganic insulator such as SiNx is formed on the data lines 171 and the drain electrodes 175.

A plurality of red, green and blue color filters 230R, 230G and 230B is formed on the first passivation layer 801. The color filters 230R, 230G and 230B extend substantially along the columns of the pixel areas defined by the data lines 171 such that they curve periodically. The neighboring color filters 230R, 230G and 230B overlap each other on the data lines 171 to form hills. The color filters 230R, 230G and 230B are not provided near the drain electrodes 175 and a peripheral area including the expansions 125 and 179 of the gate lines 121 and the data lines 179.

A second passivation layer 802 preferably made of photosensitive organic material is formed on the color filters 230R, 230G and 230B. The second passivation layer 802 also forms hills over the hills formed by the color filters 230R, 230G and 230B. The second passivation layer 802 prevents the color filters 230 from being exposed through the cutouts 271 of the common electrode 270 to contaminate the LC layer 3 and may be made of inorganic insulator such as SiNx and $SiO_2$.

The passivation layers 801 and 802 have a plurality of contact holes 181 and 183, and the passivation layers 801 and 802 and the gate insulating layer 140 have a plurality of contact holes 182, 184 and 185. The sidewalls of the contact holes 181, 182, 183 as well as the contact holes 184 and 185 make an angle of about 30 to about 85 degrees with respect to the surface of the substrate 110 and have stepped profiles including lower stairs 181b, 182b and 183b and upper stairs 181a, 182a and 183a.

A plurality of pixel electrodes 190, a plurality of contact assistants 95 and 97, and a storage connecting bridge 91 are formed on the second passivation layer 802.

The common electrode panel 200 includes a black matrix 220 and a common electrode 270 formed on an insulating substrate 210. In comparison to the common electrode panel 200 shown in FIGS. 2 and 3, the common electrode panel 200 shown in FIGS. 12 and 13 has no color filter and no overcoat.

Since the color filters 230R, 230G and 230B and the pixel electrodes 190 are provided on the TFT array panel 100, the LCD shown in FIGS. 12 and 13 may have a large alignment margin for aligning the TFT array panel 100 and the common electrode panel 200.

A TFT array panel 100 shown in FIGS. 12 and 13 may be manufactured by depositing a first passivation layer 801, forming a plurality of red, green, and blue color filters 230R, 230G, and 230B, coating a second passivation layer 802 made of a photosensitive organic layer, exposing and developing the passivation layer 802 to form upper portions of a plurality of contact holes 181-185, removing exposed portions of the first passivation layer 801 and the gate insulating layer 140 to form lower portions of the contact holes 181-185, and forming a plurality of pixel electrodes 190, a plurality of contact assistants 95 and 97, and a plurality of storage connecting bridges 91, after forming the gate lines 121, the storage electrode lines 131, the gate insulating layer 140, the semiconductor stripes 151, the ohmic contacts 161 and 165, the data lines 171, and the drain electrodes 175 as described above with reference to FIGS. 1-4B. The formation of the color filters 230R, 230G, and 230B includes three repetitions of coating, exposing, and developing a photosensitive film including a colored pigment.

Figure 14:
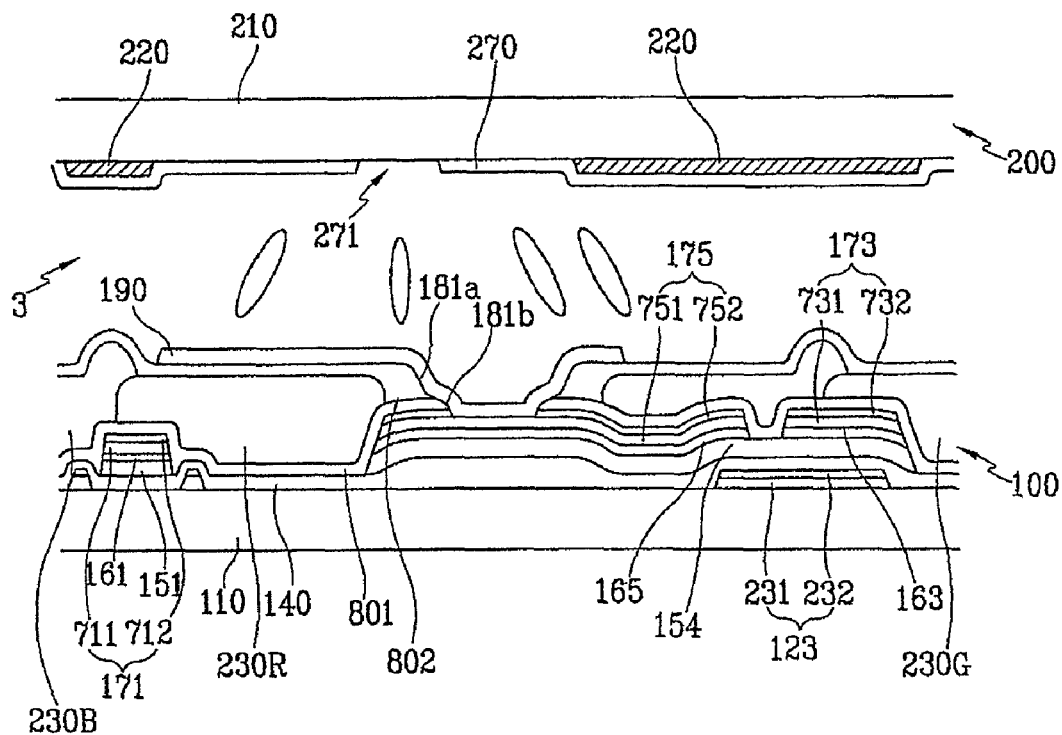
FIGS. 14 and 15 are sectional views of an LCD according to another exemplary embodiment of the present invention.
Figure 15:
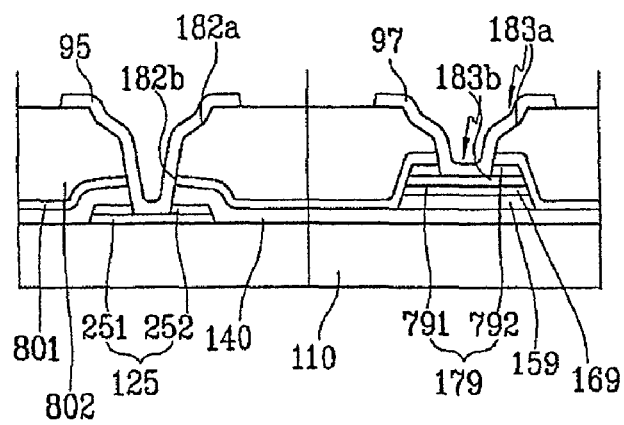

FIGS. 14 and 15 are sectional views of an LCD according to another embodiment of the present invention.

Referring to FIGS. 14 and 15, an LCD according to the present embodiment of the invention includes a TFT array panel 100, a common electrode panel 200, and a LC layer 3 interposed therebetween.

Layered structures of the panels 100 and 200 according to the present embodiment of the invention are substantially the same as those shown in FIGS. 12 and 13.

Concerning the TFT array panel 100, a plurality of gate lines 121 and a plurality of storage electrode lines 131 are formed on a substrate 110. A gate insulating layer 140 is formed on the gate lines 121 and the storage electrode lines 131, and a plurality of semiconductor stripes 151 including a plurality of projections 154, and a plurality of ohmic contact stripes 161 including a plurality of projections 163 and a plurality of ohmic contact islands 165 are sequentially formed on the gate insulating layer 140. A plurality of data lines 171 and a plurality of drain electrodes 175 are formed on the ohmic contacts 161 and 165, and a first passivation layer 801 is formed on the data lines 171 and the drain electrodes 175. A plurality of red, green and blue color filters 230R, 230G and 230B are formed on the first passivation layer 801 and a second passivation layer 802 is formed on the color filters 230R, 230G and 230B. A plurality of contact holes 181-185 is provided at the first and the second passivation layers 801 and 802 and the gate insulating layer 140, and a plurality of pixel electrodes 190, a plurality of contact assistants 95 and 97, and a plurality of storage connecting bridges 91 are formed on the second passivation layer 802.

Concerning the common electrode panel 200, a black matrix 220 and a common electrode 270 are sequentially formed on an insulating substrate 210.

Different from the LCD shown in FIGS. 12 and 13, the semiconductor stripes 151 have substantially the same planar shapes as the data lines 171 and the drain electrodes 175 as well as the underlying ohmic contacts 161 and 165, except for the projections 154 where TFTs are provided. In detail, the projections 154 include some exposed portions, which are not covered with the data lines 171 and the drain electrodes 175 such as portions located between the source electrodes 173 and the drain electrodes 175.

A TFT array panel 100 shown in FIGS. 14 and 15 may be manufactured by forming a first passivation layer 801, a plurality of red, green, and blue color filters 230R, 230G, and 230B, a second passivation layer 802, a plurality of pixel electrodes 190, a plurality of contact assistants 95 and 97, and a plurality of storage connecting bridges 91 based on the steps described with reference to FIGS. 12 and 13, after forming the gate lines 121, the storage electrode lines 131, the gate insulating layer 140, the semiconductor stripes 151, the ohmic contacts 161 and 165, the data lines 171, and the drain electrodes 175 based on the steps described with reference to FIGS. 6-10B.

Figure 16:
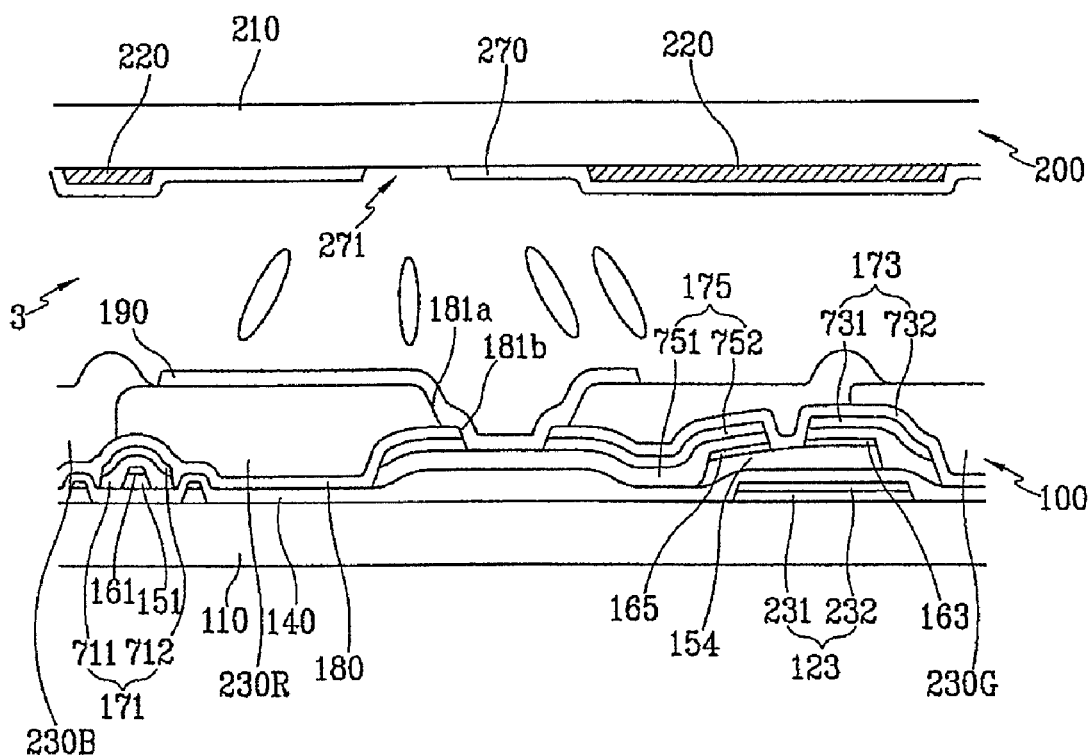
FIGS. 16 and 17 are sectional views of an LCD according to another exemplary embodiment of the present invention.
Figure 17:
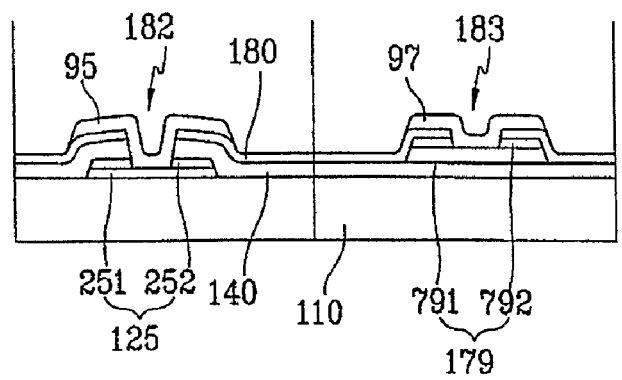

FIGS. 16 and 17 are sectional views of an LCD according to another embodiment of the present invention.

Referring to FIGS. 16 and 17, an LCD according to the present embodiment of the invention includes a TFT array panel 100, a common electrode panel 200, and a LC layer 3 interposed therebetween.

Layered structures of the panels 100 and 200 according to the present embodiment of the invention are substantially the same as those shown in FIGS. 12 and 13.

Concerning the TFT array panel 100, a plurality of gate lines 121 and a plurality of storage electrode lines 131 are formed on a substrate 110. A gate insulating layer 140 is formed on the gate lines 121 and the storage electrode lines 131, and a plurality of semiconductor stripes 151 including a plurality of projections 154, and a plurality of ohmic contact stripes 161 including a plurality of projections 163 and a plurality of ohmic contact islands 165 are sequentially formed on the gate insulating layer 140. A plurality of data lines 171 and a plurality of drain electrodes 175 are formed on the ohmic contacts 161 and 165, and a passivation layer 180 is formed on the data lines 171 and the drain electrodes 175. A plurality of red, green and blue color filters 230R, 230G, and 230B are formed on the passivation layer 180 and a plurality of pixel electrodes 190, a plurality of contact assistants 95 and 97, and a plurality of storage connecting bridges 91 are formed on the passivation layer 180. A plurality of contact holes 181-185 is provided in the passivation layer 180 and the gate insulating layer 140.

Concerning the common electrode panel 200, a black matrix 220 and a common electrode 270 are sequentially formed on an insulating substrate 210.

Different from the LCD shown in FIGS. 12 and 13, there is no additional passivation layer on the color filters 230R, 230G, and 230B. Accordingly, lateral surfaces of the color filters 230R, 230G, and 230B near the contact holes 181, 184 and 185 serve as upper portions of sidewalls of the contact holes 181, 184 and 185 to smooth the profiles thereof as shown in FIG. 16. This structure is preferable when the color filters 230R, 230G and 230B do not discharge impurities such as pigment that may contaminate the LC layer 3.

Figure 18:
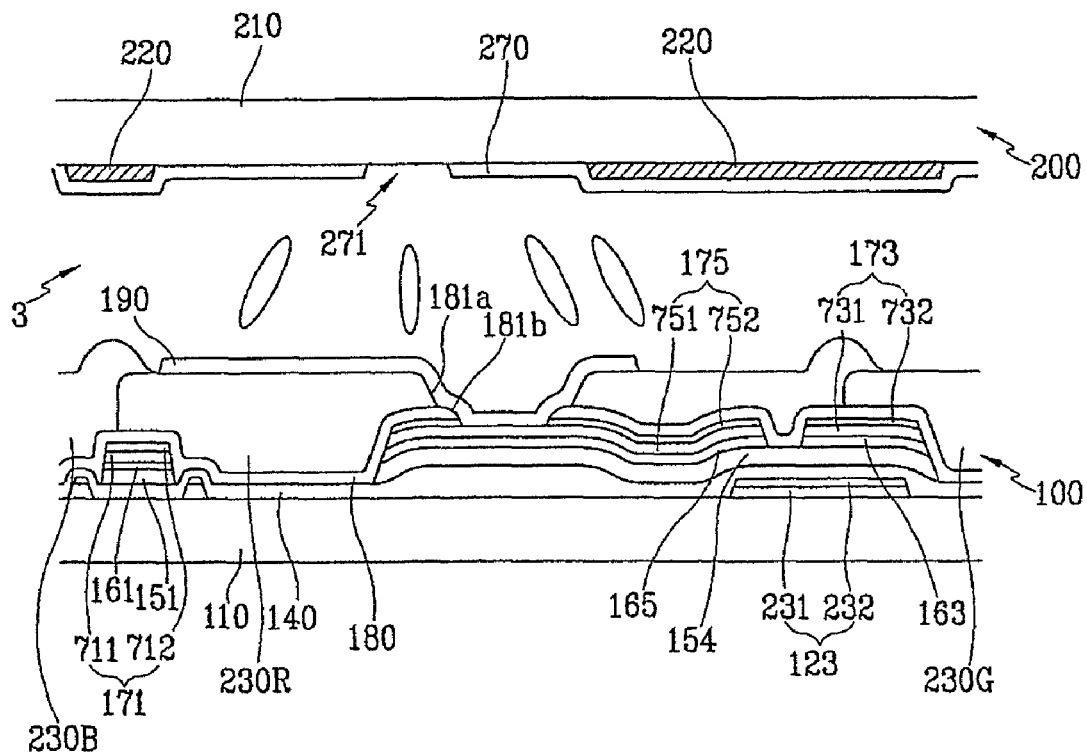
FIGS. 18 and 19 are sectional views of an LCD according to another exemplary embodiment of the present invention.
Figure 19:
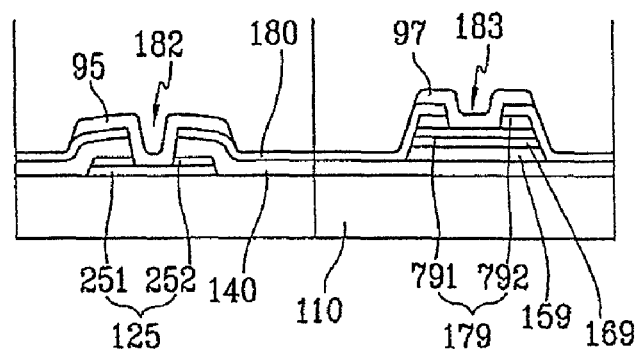

FIGS. 18 and 19 are sectional views of an LCD according to another embodiment of the present invention.

Referring to FIGS. 18 and 19, an LCD according to the present embodiment of the invention includes a TFT array panel 100, a common electrode panel 200, and a LC layer 3 interposed therebetween.

Layered structures of the panels 100 and 200 according to the present embodiment of the invention are substantially the same as those shown in FIGS. 16 and 17.

Concerning the TFT array panel 100, a plurality of gate lines 121 and a plurality of storage electrode lines 131 are formed on a substrate 110. A gate insulating layer 140 is formed on the gate lines 121 and the storage electrode lines 131, and a plurality of semiconductor stripes 151 including a plurality of projections 154, and a plurality of ohmic contact stripes 161 including a plurality of projections 163 and a plurality of ohmic contact islands 165 are sequentially formed on the gate insulating layer 140. A plurality of data lines 171 and a plurality of drain electrodes 175 are formed on the ohmic contacts 161 and 165, and a passivation layer 180 is formed on the data lines 171 and the drain electrodes 175. A plurality of red, green and blue color filters 230R, 230G and 230B are formed on the passivation layer 180. A plurality of contact holes 181-185 are provided in the passivation layer 180 and the gate insulating layer 140, and a plurality of pixel electrodes 190, a plurality of contact assistants 95 and 97, and a plurality of storage connecting bridges 91 are formed on the passivation layer 180.

Concerning the common electrode panel 200, a black matrix 220 and a common electrode 270 are sequentially formed on an insulating substrate 210.

Different from the LCD shown in FIGS. 16 and 17, the semiconductor stripes 151 have substantially the same planar shape as the data lines 171 and the drain electrodes 175 as well as the underlying ohmic contacts 161 and 165, except for the projections 154 where TFTs are provided. In detail, the projections 154 include some exposed portions, which are not covered with the data lines 171 and the drain electrodes 175 such as portions located between the source electrodes 173 and the drain electrodes 175.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
a thin film transistor panel comprising:
a first substrate;
a data line formed over the first substrate and the data line comprises at least one bent portion;
a gate line formed over the first substrate; and
a pixel electrode;
a common electrode panel, comprising:
a second substrate; and
a common electrode formed over the second substrate; and
a liquid crystal layer formed between the thin film transistor panel and the common electrode panel and comprising liquid crystal molecules aligned vertical to surface of the first substrate,
wherein the pixel electrode comprises at least one edge parallel to the bent portion, and wherein the storage electrode is parallel to at least a portion of the data line.

2. The liquid crystal display of claim 1, wherein the data line comprises a repeated structure of an oblique portion and vertical portion.

3. The liquid crystal display of claim 2, wherein the storage electrode is parallel to at least one of the oblique portions or the vertical portions of the repeated structure of the data line.

4. The liquid crystal display of claim 2, wherein the pixel electrode comprises at least one edge parallel to one of the oblique portions or the vertical portions of the repeated structure.

5. The liquid crystal display of claim 4, wherein the common electrode comprises an upper cutout having a pair of upper bent portions and an upper vertical portion.

6. The liquid crystal display of claim 4, wherein the storage electrode is parallel to at least one of the oblique portions or the vertical portions of the repeated structure of the data line.

7. The liquid crystal display of claim 6, wherein the common electrode comprises an upper cutout having a pair of upper bent portions and an upper vertical portion.

8. The liquid crystal display of claim 7, wherein the storage electrode comprises a horizontal portion corresponding to the upper vertical portion of the common electrode.

9. The liquid crystal display of claim 1, wherein the data line comprises a set of repeated structure including two pairs of oblique portions and three vertical portions.

10. The liquid crystal display of claim 9, wherein two pairs of oblique portions have symmetry with respect to a horizontal line.

11. The liquid crystal display of claim 9, wherein the pixel electrode comprises at least one edge parallel to at least one of the oblique portions or one of the vertical portions of the set of repeated structure.

12. The liquid crystal display of claim 11, wherein the pixel electrode comprises a cutout that divides the pixel electrode into a first portion and a second portion.

13. The liquid crystal display of claim 11, wherein the common electrode comprises an upper cutout having a pair of upper bent portions and an upper vertical portion.

14. The liquid crystal display of claim 13, wherein the pixel electrode comprises a cutout that divides the pixel electrode into a first portion and a second portion.

15. The liquid crystal display of claim 14, wherein the cutout is disposed near the vertical portion located in the middle among the three vertical portions, and extending in a horizontal direction.

16. The liquid crystal display of claim 15, wherein one of the upper bent portions is disposed in the first portion of the pixel electrode and the other of the upper bent portions is disposed in the second portion of the pixel electrode.

17. The liquid crystal display of claim 16, wherein the upper vertical portion is disposed near the vertical portion located in the middle among the three vertical portions and connected to the pair of upper bent portions at each end.

18. The liquid crystal display of claim 9, further comprising a storage electrode parallel to at least one portion of the set of repeated structure.

19. The liquid crystal display of claim 18, further comprising a storage electrode line parallel to the gate line.

20. The liquid crystal display of claim 9, wherein the data line is curved periodically to form the multi-bent band shape.

21. The liquid crystal display of claim 20, wherein the pixel electrode comprises at least one edge parallel to the multi-bent band shape of the data line.

* * * * *